(12) United States Patent
Kim et al.

(10) Patent No.: US 12,266,792 B2
(45) Date of Patent: *Apr. 1, 2025

(54) NEGATIVE ELECTRODE FOR LITHIUM SECONDARY BATTERY AND LITHIUM SECONDARY BATTERY INCLUDING THE SAME

(71) Applicant: SK On Co., Ltd., Seoul (KR)

(72) Inventors: Hyo Mi Kim, Daejeon (KR); Yong Seok Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,086

(22) Filed: Oct. 18, 2023

(65) Prior Publication Data
US 2024/0047661 A1 Feb. 8, 2024

Related U.S. Application Data

(63) Continuation of application No. 17/361,427, filed on Jun. 29, 2021.

(30) Foreign Application Priority Data

Jun. 30, 2020 (KR) .................. 10-2020-0079922

(51) Int. Cl.
| | | |
|---|---|---|
| *H01M 4/38* | (2006.01) | |
| *H01M 4/58* | (2010.01) | |
| *H01M 4/583* | (2010.01) | |
| *H01M 4/587* | (2010.01) | |
| *H01M 4/62* | (2006.01) | |
| *H01M 4/64* | (2006.01) | |
| *H01M 10/02* | (2006.01) | |
| *H01M 10/0525* | (2010.01) | |
| *H01M 4/02* | (2006.01) | |

(52) U.S. Cl.
CPC .......... *H01M 4/386* (2013.01); *H01M 4/583* (2013.01); *H01M 4/587* (2013.01); *H01M 4/625* (2013.01); *H01M 4/64* (2013.01); *H01M 10/02* (2013.01); *H01M 10/0525* (2013.01); *H01M 2004/027* (2013.01)

(58) Field of Classification Search
CPC ........ H01M 4/583; H01M 4/386; H01M 4/34; H01M 10/0525
See application file for complete search history.

(56) References Cited

U.S. PATENT DOCUMENTS

| | | | |
|---|---|---|---|
| 2002/0009646 A1* | 1/2002 | Matsubara | H01M 4/04 429/232 |
| 2016/0204464 A1 | 7/2016 | Cho et al. | |
| 2016/0294017 A1 | 10/2016 | Ebisuzaki et al. | |
| 2016/0372798 A1 | 12/2016 | Ishii | |
| 2018/0062158 A1 | 3/2018 | Kim et al. | |
| 2020/0235383 A1 | 7/2020 | Shin et al. | |
| 2021/0083273 A1 | 3/2021 | Song et al. | |

FOREIGN PATENT DOCUMENTS

| | | |
|---|---|---|
| JP | 2009064574 A | 3/2009 |
| JP | 6268729 B2 | 1/2018 |
| KR | 1020130135071 A | 12/2013 |
| KR | 1020180023820 A | 3/2018 |
| KR | 1020190042299 A | 4/2019 |
| KR | 1020190065148 A | 6/2019 |
| KR | 1020190065172 A | 6/2019 |

OTHER PUBLICATIONS

Machine Translation of: JP 2009-064574 A, Atsumi et al., Mar. 26, 2009.*

* cited by examiner

*Primary Examiner* — Kenneth J Douyette
(74) *Attorney, Agent, or Firm* — The Webb Law Firm

(57) ABSTRACT

Provided are a negative electrode for a lithium secondary negative electrode battery including: a current collector; a first negative electrode active material layer disposed on the current collector and including a silicon-based active material, a first graphite-based active material, and a linear conductive material; and a second negative electrode active material layer disposed on the first negative electrode active material layer and including a second graphite-based active material. The first graphite-based active material has a carbon coating layer on at least a part of a surface. Also provided is a lithium secondary battery including the negative electrode.

11 Claims, No Drawings

NEGATIVE ELECTRODE FOR LITHIUM SECONDARY BATTERY AND LITHIUM SECONDARY BATTERY INCLUDING THE SAME

CROSS-REFERENCE TO RELATED APPLICATIONS

This application is a continuation of U.S. patent application Ser. No. 17/361,427, filed Jun. 29, 2001, now U.S. Pat. No. 12,062,784, which claims priority to Korean Patent Application No. 10-2020-0079922 filed Jun. 30, 2020, the disclosures of which are hereby incorporated by reference in their entirety.

BACKGROUND OF THE INVENTION

Field of the Invention

The following disclosure relates to a negative electrode for a lithium secondary battery and a lithium secondary battery including the same.

Description of Related Art

Recently, due to an issue of global warming, a demand for environmentally friendly technologies is rapidly increasing in response thereto. In particular, as a technical demand for electric vehicles and energy storage systems (ESS) increases, a demand for a lithium secondary battery being in the spotlight as an energy storage device is exploding. Therefore, studies to improve an energy density of the lithium secondary battery are in progress.

However, though previously commercialized lithium secondary batteries commonly use a graphite active material such as natural graphite and artificial graphite, the batteries have a low energy density due to the low theoretical capacity of the graphite (372 mAh/g), and thus, studies to improve the energy density by developing a new negative electrode material are in progress.

As a solution thereto, a Si-based material having a high theoretical capacity (3580 mAh/g) is emerging as one solution. However, the Si-based material as such has a disadvantage of a deteriorated battery life characteristic due to large volume expansion (~400%) in the course of repeated charge and discharge. Thus, as a method of solving the issue of large volume expansion of the Si material, a $SiO_x$ material which has a low volume expansion rate as compared with Si has been developed. However, since there are problems in that interfacial resistance is increased and a life characteristic is deteriorated due to a side reaction of the Si-based material and an electrolyte and electrode adhesive strength is reduced due to volume expansion, there is a limitation in application.

SUMMARY OF THE INVENTION

An embodiment of the present invention is directed to reducing a side reaction of a silicon-based material and an electrolyte by disposing the silicon-based material in a lower layer of an electrode (active material layer) and disposing graphite-based active material in an upper layer which is substantially in contact with the electrolyte with a high surface area.

By using a CNT conductive material for preventing isolation of an active material due to volume expansion of the silicon-based material, a capacity of the entire negative electrode is secured and also an electrochemical path is maintained.

Another embodiment of the present invention is directed to improving desorption between a current collector and an electrode active material layer by disposing a graphite-based active material having an improved adhesive property in a lower layer.

In one general aspect, a negative electrode for a lithium secondary battery includes: a current collector; a first negative electrode active material layer disposed on the current collector and including a silicon-based active material, a first graphite-based active material, and a linear conductive material; and a second negative electrode active material layer disposed on the first negative electrode active material layer and including a second graphite-based active material, wherein the first graphite-based active material has a carbon coating layer on at least a part of a surface.

The first graphite-based active material may be artificial graphite or a mixture of artificial graphite and natural graphite.

The silicon-based active material and the first graphite-based active material may be included at a weight ratio of 1:9 to 4:6.

The carbon coating layer included on the first graphite-based active material may be formed from hard carbon, soft carbon, heavy oil, or pitch.

The linear conductive material may be carbon nanotubes (CNT) and may be included at 0.1 to 1 wt % with respect to a total weight of the first negative electrode active material layer.

The first negative electrode active material layer may satisfy the following Relation 1:

$$0.2 < A_1/A_2(\%) < 1.7 \quad \text{[Relation 1]}$$

wherein $A_1$ is a content (part by weight) of the linear conductive material, $A_2$ is a content (part by weight) of the silicon-based active material, and $A_1/A_2$ is a percentage (%) of the content of the linear conductive material to the content of the silicon-based active material.

The second negative electrode active material layer may not include the silicon-based active material, and the second graphite-based active material may be artificial graphite and may not include the carbon coating layer.

The second negative electrode active material may not include the conductive material.

In another general aspect, a lithium secondary battery includes the negative electrode; a positive electrode; a separator; and an electrolyte.

Other features and aspects will be apparent from the following detailed description, the drawings, and the claims.

DESCRIPTION OF THE INVENTION

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

In the present specification, the particle size of first and second graphite-based active materials and the like may refer to D50, and D50 refers to a diameter of a particle with a cumulative volume of 50% when cumulated from the smallest particle in measurement of a particle size distribution by a laser scattering method. Here, for D50, the particle size distribution may be measured by collecting a sample for the prepared carbonaceous material according to a KS A ISO 13320-1 standard and using Mastersizer 3000 from Malvern Panalytical Ltd. Specifically, after particles are dispersed in ethanol as a solvent, if necessary, using an ultrasonic disperser, a volume density may be measured.

In an exemplary embodiment of the present invention, a negative electrode for a lithium secondary battery is provided. The negative electrode includes: a current collector; a first negative electrode active material layer disposed on the current collector and including a silicon-based active material, a first graphite-based active material, and a linear conductive material; and a second negative electrode active material layer disposed on the first negative electrode active material layer and including a second graphite-based active material, wherein the first graphite-based active material has a carbon coating layer on at least a part of a surface.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The first negative electrode active material layer includes a silicon-based active material, a first graphite-based active material, and a linear conductive material.

The silicon-based active material may be a silicon-based material, for example, Si, $SiO_x(0<x<2)$, a Si-Q alloy (Q is an element selected from the group consisting of alkali metals, alkali earth metals, Group 13 elements, Group 14 elements, Group 15 elements, Group 16 elements, transition metals, rare earth elements, and combinations thereof, except Si), a Si-Carbon composite, or a mixture of at least one thereof and $SiO_2$. Preferably, the silicon-based active material may be Si or $SiO_x$ $(0<x<2)$, preferably $SiO_x$ $(0<x<2)$.

The first graphite-based active material may be artificial graphite or a mixture of artificial graphite and natural graphite. The graphite-based active material may have a particle size of 8 to 20 μm and may be amorphous, plate-like, flake-like, spherical, or fibrous, but the present invention is not limited thereto. The first graphite-based active material as such is characterized by having excellent adhesive strength. In particular, artificial graphite having relatively high strength is included in the lower layer, thereby improving problems of decreased diffusion of lithium ion and decreased porosity by pressed graphite particles, which are the problems when only natural graphite is included, and also, a carbon coating layer is formed on the surface of the artificial graphite, thereby having excellent interfacial adhesive strength between the negative electrode active material layer and the current collector, as described above.

Meanwhile, when the first graphite-based active material is a mixture of artificial graphite and natural graphite, preferably, the content of the artificial graphite may be the same as or higher than the content of the natural graphite, and more preferably, the artificial graphite and the natural graphite may be included at a weight ratio of 9.5:0.5 to 5:5, preferably at a weight ratio of 9:1 to 5:5, and more preferably at a weight ratio of 9:1 to 6:4. Thus, adhesive strength between the current collector and the active material layer is improved, which improves a high-rate charge capacity retention rate and a normal life characteristic, and thus, is preferred.

The first graphite-based active material includes a carbon coating layer, specifically on at least a part of the surface of graphite particles. The carbon coating layer is formed from hard carbon, soft carbon, heavy oil, or pitch and may be a non-crystalline carbon coating layer, and as a non-limiting example, hard carbon may be heat-treated at 700 to 1200° C. for 3 to 6 hours to produce a coating layer and soft carbon may be heat-treated at 1000 to 1300° C. for 3 to 6 hours to produce a coating layer, but the present invention is not limited thereto.

By coating the surface of the first graphite-based active material with carbon, adhesive strength of an interface between the electrode current collector and the active material layer may be increased, and simultaneously the active material may be further mixed by the decreased content of the first binder to implement a high energy density cell. Conventionally, when the content of the binder is increased, an effect of improving adhesive strength is exhibited, but a side effect of increased resistance occurs, a conductive path between the active materials is deteriorated by the increased binder to increase the content of the conductive material, which decreases an energy density, and when the same negative electrode slurry is loaded, a thickness of the electrode is increased, which is thus not preferred. In the present invention, the first graphite-based active material having a coating layer on the surface is disposed in a layer close to the electrode current collector, thereby increasing the adhesive strength of the interface between the electrode current collector and the active material layer and improving electrode desorption due to volume expansion of the silicon-based material. In addition, a ratio of the active material relative to the first binder and the CNT conductive material in the first negative electrode active material layer may be increased to improve an energy density.

The silicon-based active material and the first graphite-based active material may be included at a weight ratio of 1:9 to 4:6, preferably at a ratio of 1.5:8.5 to 4:6, and more preferably at a weight ratio of 2:8 to 4:6. At a weight ratio of 1:9 or more, the content of the graphite-based active material is not excessively increased when an electrode of the same loading is implemented, and thus, there is no problem of an electrode thickness increase and a resistance increase, and at a weight ratio of 4:6 or less, electrode contraction/expansion during charge and discharge may be suppressed to prevent electrode desorption.

The first binder may be polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluorine rubber, various copolymers thereof, and the like, and specifically, may include PVDF, CMC, SBR, and a mixture thereof.

The linear conductive material may be carbon nanotubes CNT, for example, MWCNT, SWCNT, TWCNT, and the like. The conductive material may be included at 0.1 to 1 wt %, preferably 0.1 to 0.7 wt % or 0.1 to 0.5 wt %, and more preferably 0.1 to 0.4 wt % or 0.1 to 0.3 wt % with respect to the total weight of the first negative electrode active material layer. The linear conductive material may have excellent electrical conductivity as compared with a point-shaped conductive material such as carbon black or a plate-shaped conductive material such as artificial graphite conventionally used and may have a specific surface area twice or more, preferably 10 times or more, for example, a BET specific surface area of 400 m$^2$/g or more, preferably 500 to 700 m$^2$/g. Since the point-shaped or plate-shaped conductive material makes contact in a point shape, when a connected point contact surface falls off by volume expansion/contraction of the active material, electrical conductivity is decreased, but since the linear conductive material such as CNT makes contact linearly, it is advantageous to the volume expansion/contraction of the active material.

The first negative electrode active material layer may satisfy the following Relation 1:

$$0.2 < A_1/A_2(\%) < 1.7 \quad \text{[Relation 1]}$$

wherein $A_1$ is a content (part by weight) of the linear conductive material, $A_2$ is a content (part by weight) of the silicon-based active material, and $A_1/A_2$ is a percentage (%) of the content of the linear conductive material to the content of the silicon-based active material.

Specifically, $A_1/A_2$ may be $0.2 < A_1/A_2(\%) < 1.0$, preferably $0.2 < A_1/A_2(\%) < 0.6$. When the numerical range is more than 0.2, the conductive path is uniform, and when the numerical range is less than 1.7, the porosity in the electrode is not excessively lowered, so that a life characteristic may be improved.

The second negative electrode active material layer is disposed on the first negative electrode active material layer and is characterized by including the second graphite-based active material.

The second graphite-based active material may use assembly-type or bimodal artificial graphite and may have a particle size of 13 to 20 μm, preferably a particle size of 16 to 20 μm, as assembly-type artificial graphite. When the second graphite-based active material is the assembly type or bimodal artificial graphite, output, quick charge, and life characteristics are excellent, but adhesive strength is somewhat poor. In order to compensate for the problem, the first graphite-based active material is disposed in a lower layer (the first negative electrode active material layer) to improve the adhesive strength between the current collector and the electrode, and the output (10 s resistance and output) and quick charge (improved Li intercalation in an electrode upper layer) showing cell characteristics in a short time may be improved by the second negative electrode active material.

In addition, it may be preferred that the second graphite-based active material does not have a carbon coating layer formed on the surface. When surface-coated artificial graphite is used in the second layer, a high-rate property may be somewhat improved by a decreased interfacial resistance by a surface coating layer, but when normal and quick charge life evaluation is performed, life deterioration may be accelerated by a side reaction of an electrolyte and the surface coating layer, which is thus not preferred.

The second negative electrode active material layer may not include a silicon-based active material. The electrode upper layer, which is an area in contact with an excessive amount of the electrolyte, has problems in that an electrolyte side reaction easily occurs during battery charge and discharge, and in particular, a silicon-based active material has a very high effect on the electrode contraction/expansion when reacting with the electrolyte and the electrolyte is depleted. This leads to rapid deterioration of the life characteristic, and thus, in the present invention, in order to solve the problem, an excessive amount of the silicon-based active material is included in the lower layer (first negative electrode active material layer) and the silicon-based active material is not included in the upper layer (second negative electrode active material layer).

The second negative electrode active material layer may not include a conductive material. Since the artificial graphite in the second layer substantially has no volume expansion, no particularly improved effect is shown even in the case of using the conductive material in the second layer. Though in the conventional technology, the conductive material is distributed in each layer in a multilayer negative electrode active material layer, the linear conductive material is used only in the lower layer in the present invention, thereby maximizing the desired effect. Specifically, the total amount of the conductive material to be used in the upper layer is used in the lower layer to improve a conductive path cutting off phenomenon due to volume expansion/contraction of the silicon-based active material during charge and discharge may be improved. In addition, problems arising when the conductive material is included in the upper layer, for example, a problem in which the content of the active material is decreased by the content of the conductive material and the contents of the binder and a dispersing agent are increased for dispersing the conductive material, so that an electrode thickness is increased and resistance is increased as compared with the same slurry loading amount, may be prevented.

In the negative electrode according to an exemplary embodiment of the present invention, the graphite-based active material and the silicon-based active material may be included at a weight ratio of 95:5 to 70:30, preferably at a weight ratio of 90:10 to 70:30, with respect to the total weight of the active material in the negative electrode active material layer including the first negative electrode active material layer and the second negative electrode active material layer. Thus, a high energy density cell may be provided.

Another exemplary embodiment provides a lithium secondary battery including: the negative electrode; a positive electrode; a separator; and an electrolyte.

The negative electrode is as described above.

The positive electrode includes a current collector and a positive electrode active material layer formed by applying a positive electrode slurry including a positive electrode active material on the current collector.

The current collector may be a negative electrode current collector described above, or any known material in the art may be used, but the present invention is not limited thereto.

The positive electrode active material layer includes a positive electrode active material, and optionally, may further include a binder and a conductive material. The positive electrode active material may be any positive electrode active material known in the art, and for example, it is preferred to use a composite oxide of lithium with a metal selected from cobalt, manganese, nickel, and a combination thereof, but the present invention is not limited thereto.

The binder and the conductive material may be a negative electrode binder and a negative electrode conductive material described above, and any material known in the art may be used, but the present invention is not limited thereto.

The separator may be selected from glass fiber, polyester, polyethylene, polypropylene, polytetrafluoroethylene, or a combination thereof, and may be in the form of nonwoven or woven fabric. For example, in the lithium secondary battery, a polyolefin-based polymer separator such as polyethylene or polypropylene may be mainly used, a separator coated with a composition including a ceramic component or a polymer material for securing thermal resistance or mechanical strength may be used, optionally, a single layer or a multilayer structure may be used, and any separator known in the art may be used, but the present invention is not limited thereto.

The electrolyte includes an organic solvent and a lithium salt.

The organic solvent serves as a medium in which ions involved in the electrochemical reaction of the battery may move, and for example, carbonate-based, ester-based, ether-based, ketone-based, alcohol-based, or aprotic solvents may be used, the organic solvent may be used alone or in combination of two or more, and when used in combination of two or more, a mixing ratio may be appropriately adjusted depending on battery performance to be desired. Meanwhile, any organic solvent known in the art may be used, but the present invention is not limited thereto.

The lithium salt is dissolved in the organic solvent and acts as a source of the lithium ion in the battery to allow basic operation of the lithium secondary battery, and is a material which promotes movement of lithium ions between a positive electrode and a negative electrode. Examples of the lithium salt include $LiPF_6$, $LiBF_4$, $LiSbF_6$, $LiAsF_6$, $LiN(SO_3C_2F_5)_2$, $LiN(CF_3SO_3)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), $LiCl$, $LiI$, $LiB(C_2O_4)_2$, or a combination thereof, but the present invention is not limited thereto.

A concentration of the lithium salt may be in a range of 0.1 M to 2.0 M. When the lithium salt concentration is within the range, the electrolyte has appropriate conductivity and viscosity to show excellent electrolyte performance and lithium ions may effectively move.

In addition, the electrolyte may further include pyridine, triethylphosphate, triethanolamine, cyclic ether, ethylene diamine, n-glyme, hexaphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, and the like, if necessary, for improving charge and discharge characteristics, flame retardant characteristics, and the like. In some cases, a halogen-containing solvent such as carbon tetrachloride and ethylene trifluoride may be further included for imparting non-flammability, and fluoro-ethylene carbonate (FEC), propene sultone (PRS), fluoro-propylene carbonate (FPC), and the like may be further included for improving conservation properties at a high temperature.

The method of producing a lithium secondary battery according to the present invention for achieving the above object may include laminating the produced negative electrode, separator, and positive electrode in this order to form an electrode assembly, placing the produced electrode assembly in a cylindrical battery case or an angled battery case, and then injecting an electrolyte. Otherwise, the lithium secondary battery may be produced by laminating the electrode assembly and immersing the assembly in the electrolyte to obtain a resultant product which is then placed in a battery case and sealed.

As the battery case used in the present invention, those commonly used in the art may be adopted, there is no limitation in appearance depending on the battery use, and for example, a cylindrical shape, an angled shape, a pouch shape, a coin shape, or the like using a can may be used.

The lithium secondary battery according to the present invention may be used in a battery cell used as a power supply of a small device, and also may be preferably used as a unit cell in a medium or large battery module including a plurality of battery cells. Preferred examples of the medium or large device include an electric automobile, a hybrid electric automobile, a plug-in hybrid electric automobile, a system for power storage, and the like, but are not limited thereto.

Hereinafter, the preferred Examples and Comparative Examples of the present invention will be described. However, the following Examples are only a preferred exemplary embodiment of the present invention, and the present invention is not limited thereto.

EXAMPLES

Example 1

<Production of Carbon-Coated First Graphite-Based Active Material>

100 parts by mass of the artificial graphite (D50: 20 μm) and 9.4 parts by mass of pitch derived from coal were added to a kneader having sigma or z-type stirring blades, preheated to 128° C. and were mixed for 20 minutes. The thus-obtained slurry type mixture was heated in a batch heating furnace at 350° C. for 1 hour under a nitrogen/oxygen mixed atmosphere, and was heat-treated for 1 hour while maintaining the temperature at 900° C. After radiational cooling under an inert atmosphere, the obtained powder was pulverized to obtain artificial graphite particles coated with non-crystalline carbon (first graphite-based active material).

<Production of Negative Electrode>

A negative electrode active material in which the produced non-crystalline carbon-coated first graphite-based active material and silicon oxide ($SiO_x$, $0<x<2$, D50: 5 μm) were mixed at a weight ratio of 66.5:33.5, a CNT conductive material, and a binder (weight ratio of CMC/SBR=1.2/1.5) were mixed at a weight ratio of 97.1:0.2:2.7 and water was added to produce a first negative electrode slurry.

Artificial graphite having a bimodal particle diameter distribution (D50: 20 μm) and the binder (weight ratio of CMC/SBR=1.2/1.5) were mixed at a weight ratio of 97.3:2.7 and water was added to produce a second negative electrode slurry.

On one surface of a copper current collector (copper foil having a thickness of 8 μm), the first negative electrode slurry and the second negative electrode slurry produced above were coated and dried to form a first negative electrode active material layer and a second negative electrode active material layer. Here, each loading was 4 mg/cm² and 6.2 mg/cm². This was rolled to have an electrode density of 1.77 g/cc to produce a negative electrode.

<Production of Positive Electrode>

Li[Ni$_{0.88}$Co$_{0.1}$Mn$_{0.02}$]O$_2$ as a positive electrode active material, carbon black as a conductive material, and polyvinylidene fluoride (PVdF) as a binder were mixed at a weight ratio of 96.5:2:1.5 to produce a slurry. The slurry was uniformly coated on an aluminum foil having a thickness of 12 μm and dried under vacuum to produce a positive electrode for a secondary battery.

<Production of Half Battery>

The produced negative electrode and a lithium metal were used as a counter electrode, a PE separator was interposed between the negative electrode and the counter electrode, an electrolyte was injected, and a coin cell (CR2032) was assembled. The assembled coin cell was paused at room temperature for 3-24 hours to produce a half battery. Here, the electrolyte was obtained by mixing a lithium salt 1 M LiPF$_6$ with an organic solvent (volume ratio of EC:EMC=3:7) and mixing with an electrolyte additive FEC 3 vol %.

<Production of Secondary Battery>

The positive electrode and the negative electrode were notched at a predetermined size, respectively and laminated, a separator (polyethylene, thickness 13 μm) was interposed between the positive electrode and the negative electrode to form an electrode cell, and then each tab part of the positive electrode and the negative electrode was welded. The welded assembly of positive electrode/separator/negative electrode was placed in a pouch, and three sides except an electrolyte injection part side were sealed. Here, a portion where there was an electrode tab was included in a sealing part.

The electrolyte was injected through the other side except the sealing part, the other side was sealed, and the battery was immersed for 12 hours or more.

The electrolyte was obtained by dissolving 1 M LiPF$_6$ in a mixed solvent of EC/EMC/DEC (volume ratio of 25/45/30) and adding 1 wt % of vinylene carbonate (VC), 0.5 wt % of 1,3-propene sultone (PRS), and 0.5 wt % of lithium bis(oxalato)borate (LiBOB).

Thereafter, pre-charge was performed with a current corresponding to 0.25 C for 36 minutes. Degassing was performed after 1 hour, aging was performed for 24 hours or more, and then formation charge and discharge were performed (charge condition: CC-CV 0.2 C 4.2 V 0.05 C CUT-OFF, discharge condition: CC 0.2 C 2.5 V CUT-OFF). Thereafter, standard charge and discharge were performed (charge condition: CC-CV 0.5 C, 4.2 V, 0.05 C CUT-OFF, discharge condition: CC 0.5 C, 2.5 V CUT-OFF).

EVALUATION EXAMPLE

[Evaluation Example 1]: Evaluation of Adhesive Strength Characteristic by Formation of Multilayer Negative Electrode Active Material Layer and Application of Carbon-Coated Graphite-Based Active Material Example 2

A negative electrode, a coin cell, and a secondary battery were produced in the same manner as in Example 1, except that the non-crystalline carbon-coated first graphite-based active material produced was used in place of the second graphite-based active material.

Comparative Example 1

A negative electrode and a coil cell were produced in the same manner as in Example 1, except that the second graphite-based active material without carbon coating was used in the first negative electrode slurry in place of the carbon-coated first graphite-based active material, and the carbon-coated first graphite-based active material was used in the second negative electrode slurry in place of the second graphite-based active material without carbon coating.

Comparative Example 2

A negative electrode and a coil cell were produced in the same manner as in Example 1, except that the first negative electrode active material layer was loaded at 10.2 mg/cm$^2$ on a current collector, without forming the second negative electrode active material layer.

Evaluation Method

Evaluation of Interfacial Adhesive Strength Between Negative Electrode Active Material Layer and Current Collector The produced negative electrode was cut into a size of 18 mm wide and 150 mm long, a tape having a width of 18 mm was attached to a foil layer of the negative electrode, and sufficient adhesion was made with a roller having a load of 2 kg. The active material layer of the negative electrode was attached to one side of a tensile tester using a double-sided tape. A tape attached to a foil was engaged to the other side of the tensile tester, and adhesive strength was measured. Measurement results are shown in the following Table 1.

Evaluation of Interfacial Resistance (EIS, Electrochemical Impedance Spectroscopy)

The produced coil cell was set at SOC 50%, and the interfacial resistance value of the negative electrode was measured in a range of 10 kHz to 100 mHz using EIS. Measurement results are shown in the following Table 1.

TABLE 1

| | Presence or absence of carbon coating on graphite particle surface | | Composition of active material of negative electrode active material layer | | Adhesive strength (N) | Interfacial resistance (Ohm) |
|---|---|---|---|---|---|---|
| | First graphite-based active material | Second graphite-based active material | First layer | Second layer | | |
| Example 1 | Carbon coating ○ | Carbon coating x | Graphite-based + silicon-based | Graphite-based alone | 0.50 | 3.50 |
| Example 2 | Carbon coating ○ | Carbon coating ○ | Graphite-based + silicon-based | Graphite-based alone | 0.50 | 3.41 |

TABLE 1-continued

| | Presence or absence of carbon coating on graphite particle surface | | Composition of active material of negative electrode active material layer | | Adhesive strength (N) | Interfacial resistance (Ohm) |
|---|---|---|---|---|---|---|
| | First graphite-based active material | Second graphite-based active material | First layer | Second layer | | |
| Comparative Example 1 | Carbon coating x | Carbon coating ○ | Graphite-based + silicon-based | Graphite-based alone | 0.32 | 5.42 |
| Comparative Example 2 | Carbon coating ○ | | Blending, single layer (graphite-based + silicon-based) | | 0.34 | 4.99 |

Referring to Table 1, it was confirmed that the electrodes produced according to Examples 1 and 2 of the present invention included the non-crystalline carbon-coated first graphite-based active material (first layer) to show excellent interfacial adhesive strength between the negative electrode active material layer and the current collector, as compared with Comparative Example 1.

In Comparative Example 1, it was confirmed that the graphite-based active material without a carbon coating layer was disposed in the first layer to decrease adhesive strength, whereby coil cell interfacial resistance (Reignfrequency) was increased.

In Comparative Example 2, it was confirmed that the silicon-based material was included in the upper layer portion of the negative electrode having a large contact area with the electrolyte to increase the side reaction with the electrolyte, whereby the coin cell interfacial resistance was increased.

Meanwhile, in Example 2, it was confirmed that the second layer graphite-based active material as well as the first layer graphite-based active material was coated with carbon so that the interfacial resistance value was somewhat decreased, but this may not be preferred in terms of output and quick charge.

[Evaluation Example 2]: Evaluation of Battery Characteristic Depending on Application of CNT Conductive Material Examples 3 and Comparative Examples 3 to 6

A negative electrode, a coin cell, and a secondary battery were produced in the same manner as in Example 1, except that the conductive material was used in the first and second negative electrode slurries as shown in the following Table 2.

Here, the content of the active material was changed depending on the increase or decrease in the content of the conductive material in each slurry, and the content of the binder (2.7 wt %) was the same.

Evaluation Method

Evaluation of (Normal) Charge Life Characteristic

The secondary batteries produced in Examples 1 and 3 and Comparative Examples 3 to 5 were subjected to normal charge life characteristic evaluation in a range of DOD94 (SOC2-96) in a chamber in which 25° C. was maintained. The battery was charged to the voltage corresponding to SOC96 at 0.3 C under a constant current/constant voltage (CC/CV) condition, cut-off at 0.05 C, and then discharged to the voltage corresponding to SOC2 under a constant current (CC) condition, and the discharge capacity was measured. This was repeated in 100 cycles, the discharge capacity retention rate of the evaluation of (normal) charge life characteristic was measured, and the results are summarized in the following Table 2.

TABLE 2

| | Use of conductive material | | | Life characteristic (@ 100 cycle, %) |
|---|---|---|---|---|
| | First layer (wt %) | Second layer (wt %) | Type (shape) | |
| Example 1 | Used (0.2) | — | CNT (linear) | 95.7 |
| Example 3 | Used (0.1) | Used (0.1) | CNT (linear) | 94.2 |
| Comparative Example 3 | — | Used (0.2) | CNT (linear) | 67.8 |
| Comparative Example 4 | Used (1) | Used (1) | CB (point-shaped) | 89.6 |
| Comparative Example 5 | Used (2) | — | CB (point-shaped) | 91.2 |
| Comparative Example 6 | Used (5) | — | Artificial graphite (plate-shaped) | 88.3 |

Referring to Table 2, it was seen that the secondary batteries produced according to Examples 1 to 3 of the present invention included the linear conductive material CNT in the first layer, whereby the life characteristic was improved as compared with the Comparative Example.

In Comparative Example 3 including the conductive material in the second layer, it is analyzed that an active material isolation phenomenon due to expansion of the silicon-based active material in the first layer was not suppressed, whereby the life characteristic was deteriorated. It was seen that since the point-shaped or plate-shaped conductive material of Comparative Examples 4 to 6 had a significantly smaller specific surface area than the linear conductive material, a life characteristic was deteriorated.

Meanwhile, in Example 3 using the same content of CNT distributed in the first layer and the second layer, battery performance was somewhat deteriorated as compared with Example 1. The results as such suggest that since the artificial graphite active material in the second layer did not show volume expansion substantially during battery charge and discharge as compared with the silicon-based material included in the first layer, there was no particular improvement of the effect even with the use of the conductive material in the second layer in the present invention.

In order to improve the life characteristic while maintaining an energy density identically therefrom, it was seen that it is advantageous to use an optimal content of the linear conductive material only in the first layer.

[Evaluation Example 3] Evaluation of Charge Characteristic by Rate and Evaluation of Quick Charge Life Characteristic Examples 4 and 5

A negative electrode, a coin cell, and a secondary battery were produced in the same manner as in Example 1, except that the first and second graphite-based active materials were used as shown in the following Table 3.

In Example 5, as the first graphite-based active material, a mixture of surface-coated natural graphite and surface-coated artificial graphite at a weight ratio of 1:9 was used.

Evaluation Method

Evaluation of High-Rate Charge Characteristic

The negative electrodes produced according to Examples 1, 2, 4, and 5 and the same positive electrode were used to manufacture a pouch type secondary battery (cell) having a large capacity of 20 Ah or more, and the battery was charged with a constant current at a current of 0.2 C rate until the voltage reached 4.2 V and charged with a constant voltage by cutting-off at a current of 0.05 C rate while maintaining 4.2 V in a constant voltage mode. Thereafter, the battery was discharged to 2.5 V at 0.2 C, charged at a constant current of 0.2 C rate until the voltage reached 4.2 V, and cut-off at a current of 0.05 C rate while maintaining 4.2 V in a constant voltage mode, thereby performing constant voltage charge evaluation. The evaluation of high-rate charge characteristic was performed at 2.0 C in a chamber in which a constant temperature (25° C.) was maintained. A 2 C constant current charge capacity (%) for the initial 0.2 C rate constant current charge capacity was measured, and the results are summarized in the following Table 3.

Evaluation of (Normal) Charge Life Characteristic

The negative electrodes produced according to Examples 1, 2, 4, and 5, and the same positive electrode were used to manufacture a pouch type secondary battery (cell) having a large capacity of 20 Ah, and a normal charge life characteristic evaluation in a range of DOD94 (SOC2-96) was performed in a chamber in which 25° C. was maintained. The battery was charged to the voltage corresponding to SOC96 at 0.3 C under a constant current/constant voltage (CC/CV) condition, cut-off at 0.05 C, and then discharged to the voltage corresponding to SOC2 under 0.5 C of a constant current (CC) condition, and the discharge capacity was measured. This was repeated in 100 cycles, the discharge capacity retention rate of the evaluation of (normal) charge life characteristic was measured, and the results are summarized in the following Table 3.

Quick Charge Life Characteristic Evaluation

The negative electrodes produced according to Examples 1, 2, 4, and 5, and the same positive electrode were used to manufacture a pouch type secondary battery (cell) having a large capacity of 20 Ah, and quick charge evaluation was performed with step charge at 1.25 C/1.0 C/0.75 C/0.5 C C-rate and at ⅓ C discharge C-rate in a chamber in which a constant temperature (25° C.) was maintained, set in a range of DOD72 (SOC8-80). There was a rest time of 10 minutes between charge and discharge cycles and after repeating 100/200/300 cycles, a quick charge capacity retention rate was measured, and the results are summarized in the following Table 4.

TABLE 3

| | Type and presence or absence of (carbon coating) of graphite-based active material | | Adhesive strength (N) | 2 C charge capacity retention rate (%) | Normal capacity retention rate (0.3 C charge-0.5 C discharge) (100 cycle, %) |
|---|---|---|---|---|---|
| | First layer | Second layer | | | |
| Example 1 | Artificial graphite (○) | Artificial graphite (x) | 0.5 | 72.4 | 94.9 |
| Example 2 | Artificial graphite (○) | Artificial graphite (○) | 0.5 | 72.9 | 93.0 |
| Example 4 | Artificial graphite (○) | Natural graphite (○) | 0.5 | 65.1 | 83.4 |
| Example 5 | Natural (○) + artificial graphite (○) | Artificial graphite (x) | 0.52 | 72.6 | 95.0 |

TABLE 4

| | Discharge capacity retention rate (%) by quick charge cycle (35 minutes protocol) | | |
|---|---|---|---|
| | After 100 cycles | After 200 cycles | After 300 cycles |
| Example 1 | 92.7 | 90.7 | 88.4 |
| Example 2 | 92.8 | 90.0 | 87.6 |
| Example 4 | 82.6 | — | — |
| Example 5 | 92.6 | 90.5 | 88.2 |

Referring to Tables 3 and 4, it was confirmed that i) as seen from Example 2, when surface-coated artificial graphite was used in the second layer, a C-rate characteristic was somewhat improved with a decreased interfacial resistance by a surface coating layer, but as the normal and quick charge life evaluation (long-term evaluation) proceeded, life deterioration was accelerated due to the side reaction of the electrolyte and the surface coating layer. ii) in Example 4, it is analyzed that the high-rate characteristic was not good due to the intrinsic characteristics of the natural graphite in the upper layer, and thus, the charge characteristic by rate and the quick charge life characteristic were deteriorated.

Therefore, the battery performance of Example 1 which was produced with the preferred graphite-based active material and the non-crystalline coating composition was somewhat improved as compared with that of Examples 2 and 4 which were not produced like Example 1.

Meanwhile, in Example 5, it was confirmed that the artificial graphite and the natural graphite were blended and used in the first layer, whereby the adhesive strength was improved and the 2 C charge capacity retention rate and the normal charge life characteristic were somewhat improved as compared with Example 1.

[Evaluation Example 4] Evaluation of Battery Characteristic by Content of Silicon-Based Material in First Layer Examples 6 to 10

A negative electrode and a secondary battery were produced in the same manner as in Example 1, except that the content of the silicon-based material was as shown in the following Table 5, in the first negative electrode active material layer.

Evaluation Method

Evaluation of Cell Energy Density

The negative electrodes produced according to Examples 1 and 6 to 10 and the same positive electrode were used to manufacture a pouch type secondary battery (cell) having a large capacity of 20 Ah or more, and the battery was charged with a constant current at a current of 0.3 C rate until the voltage reached 4.2 V and charged with a constant voltage by cutting-off at a current of 0.05 C rate while maintaining 4.2 V in a constant voltage mode. Thereafter, the battery was discharged at a constant current of 0.3 C rate until the voltage reached 2.5 V to measure a discharge capacity (Ah) and energy (Wh), the volume of each battery in a 4.2 V charge state was measured to calculate a volume-energy density, and the results are summarized in the following Table 5.

Quick Charge Life Characteristic Evaluation

The secondary batteries produced in Examples 1 and 6 to 10 were subjected to the same evaluation of quick charge life characteristic of Evaluation Example 3, and the results are summarized in the following Table 5.

Evaluation of (Normal) Charge Life Characteristic

The secondary batteries produced in Examples 1 and 6 to 10 were subjected to the same evaluation of normal charge life characteristic of Evaluation Example 2, and the results are summarized in the following Table 5.

TABLE 5

| | First negative electrode active material layer | | | Capacity retention rate (%) | |
| --- | --- | --- | --- | --- | --- |
| | Content of silicon-based material | Weight ratio (%) of CNT/silicon-based material | Energy Density (Wh/L) | After 100 cycles of quick charge | After 100 cycles of normal charge |
| Example 1 | 33.5 | 0.59 | 724 | 92.7 | 94.9 |
| Example 6 | 20 | 1 | 720 | 93.5 | 96.0 |
| Example 7 | 35 | 0.28 | 724 | 92.5 | 94.8 |
| Example 8 | 45 | 0.5 | 727 | 87.1 | 89.4 |
| Example 9 | 33.5 | 0.15 | 725 | 91.1 | 93.0 |
| Example 10 | 33.5 | 1.79 | 721 | 90.4 | 92.1 |

(The content of the silicon-based material is wt % with respect to the total weight of the active material in the first negative electrode active material layer.)

Referring to Table 5, in Example 9, it was confirmed that the ratio of conductive material/silicon-based material was low, whereby the conductive path was non-uniform and the life characteristic was deteriorated. However, in Example 10, it is analyzed that since the ratio of the conductive material was increased, the porosity in the electrode was decreased, whereby the life characteristic was deteriorated. In addition, it was seen that when the content of silicon in the lower layer was excessive as in Example 8, desorption between the foil and the electrode layer occurred depending on volume change during charge and discharge, and the life characteristic was deteriorated.

By coating the surface of a graphite-based active material with carbon, adhesive strength of an interface between an electrode current collector and an active material layer may be improved, and by disposing a conductive material having excellent electrical conductivity on a negative electrode active material layer on an electrode current collector including a silicon-based active material, isolation of an electrode or electrical conductive path cutting off due to volume expansion of the silicon-based material may be improved.

In addition, by introducing a negative electrode active material layer having a multilayer structure and applying a binder and a conductive material differently to each layer, respectively, the total contents of the binder and the conductive material may be decreased, and by increasing the content of the silicon-based active material, a high energy density may be implemented.

In addition, by disposing the graphite-based active material having excellent output characteristics on the upper layer of the electrode to minimize the side reaction of the silicon-based material and an electrolyte, a high-capacity negative electrode having both decreased interfacial resistance and improved output characteristics may be manufactured.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:

1. A negative electrode for a lithium secondary battery comprising:
   a current collector;
   a first negative electrode active material layer disposed on the current collector and including a silicon-based active material, a first graphite-based active material comprising artificial graphite, and a conductive material; and
   a second negative electrode active material layer disposed on the first negative electrode active material layer and including a second graphite-based active material,
   wherein the first graphite-based active material has a carbon coating layer on at least a part of a surface.

2. The negative electrode for a lithium secondary battery of claim 1, wherein the second graphite-based active material is the artificial graphite.

3. The negative electrode for a lithium secondary battery of claim 1, wherein the first graphite-based active material is artificial graphite or a mixture of artificial graphite and natural graphite.

4. The negative electrode for a lithium secondary battery of claim 1, wherein the silicon-based active material and the first graphite-based active material are included at a weight ratio of 1:9 to 4:6.

5. The negative electrode for a lithium secondary battery of claim 1, wherein the carbon coating layer included on the first graphite-based active material is formed from hard carbon, soft carbon, heavy oil, or pitch.

6. The negative electrode for a lithium secondary battery of claim 1, wherein the conductive material is a linear conductive material.

7. The negative electrode for a lithium secondary battery of claim 1, wherein the conductive material is carbon nanotubes (CNT) and is included at 0.1 to 1 wt % with respect to a total weight of the first negative electrode active material layer.

8. The negative electrode for a lithium secondary battery of claim 1, wherein the first negative electrode active material layer satisfies the following Relation 1:

$$0.2 < A_1/A_2(\%) < 1.7 \qquad \text{[Relation 1]}$$

wherein A1 is a content (part by weight) of the conductive material, A2 is a content (part by weight) of the silicon-based active material, and A1/A2 is a percentage (%) of the content of the conductive material to the content of the silicon-based active material.

9. The negative electrode for a lithium secondary battery of claim 1, wherein the second negative electrode active material layer does not include a silicon-based active material, and the second graphite-based active material does not have a carbon coating layer.

10. The negative electrode for a lithium secondary battery of claim 1, wherein the second negative electrode active material does not include the conductive material.

11. A lithium secondary battery comprising: the negative electrode of claim 1; a positive electrode; a separator; and an electrolyte.

* * * * *